Patented Oct. 26, 1943

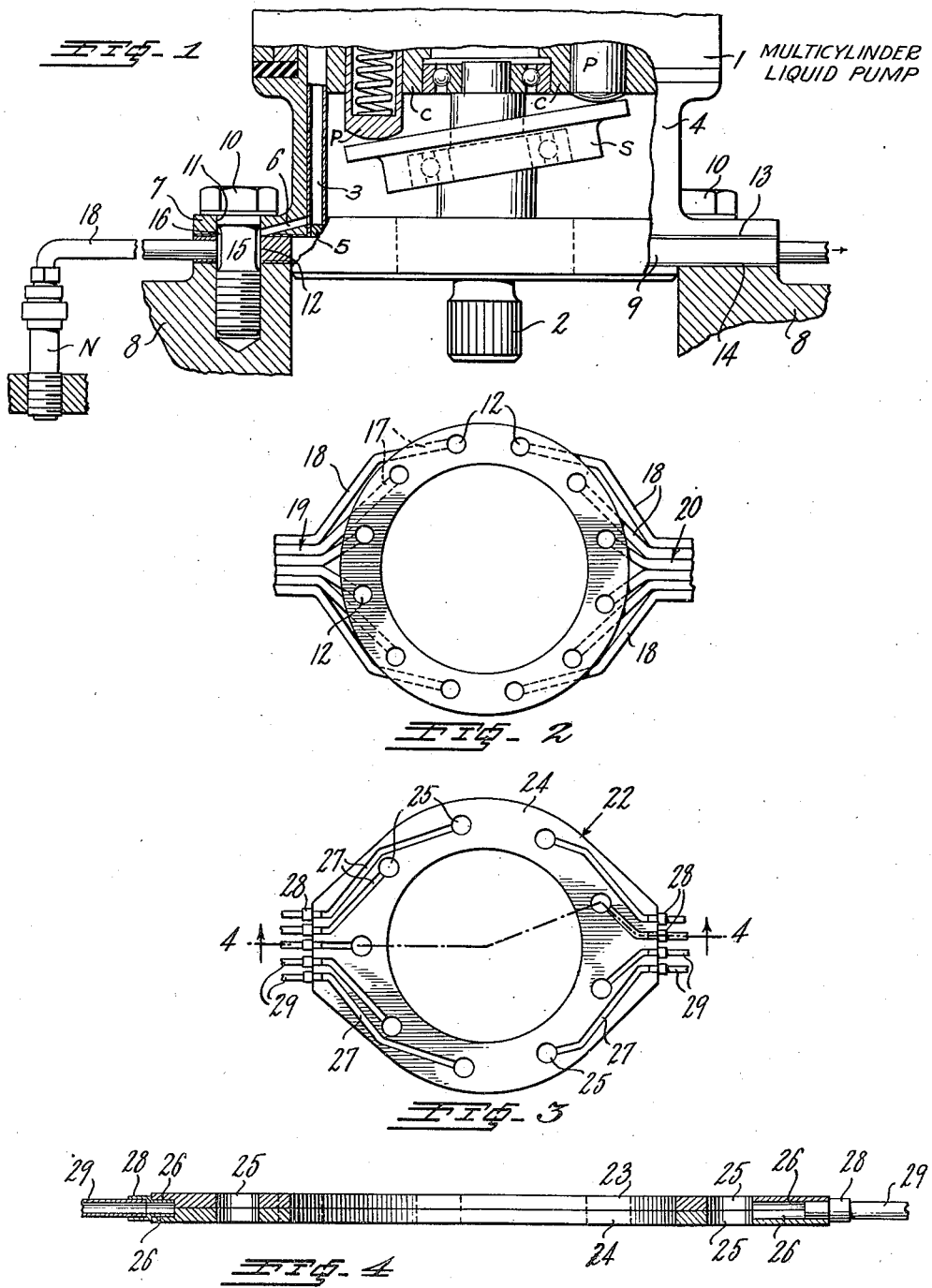

2,332,665

UNITED STATES PATENT OFFICE 2,332,665

MULTICYLINDER LIQUID PUMP ASSEMBLY

Ben G. Parsons, Detroit, Mich., assignor to American Bosch Corporation, Springfield, Mass., a corporation of New York Application February 26, 1942, Serial No. 432,450

5 Claims. (Cl. 103—173)

The present invention relates to multicylinder liquid pump assemblies for supplying liquid under pressure to places of use in translating devices of various kinds, and particularly to outlet rings in such assemblies as are adapted to be detachably fastened to the pump for conducting the liquid to the translating device.

The primary object of the invention is to provide an outlet ring of this kind which is effectively fastened to the pump in such manner that the pump may be readily removed from the outlet ring for inspection, adjustment, repair and replacement of the pump and/or the outlet ring, and if desired without disconnecting the pipes from the ring or from the translating device.

Another object is to provide improved forms of outlet rings of this type such as are adapted for rapid production at low cost in quantity, and such as are compact, economical of material and capable of long life in severe service without substantial leakage in conducting the fuel under pressure.

Other objects and advantages will be obvious from the following disclosures of outlet rings for use for example with multicylinder pumps for injecting gasoline or other fuel into an internal combustion engine, and having for example fuel outlets arranged at opposite sides of the outer periphery of the ring. In the accompanying drawing to which the disclosures refer, Fig. 1 shows in side view, partly in section and partly in elevation, a twelve-cylinder pump mounted on an engine and having a one-piece or solid outlet ring; Fig. 2 is a plan view on reduced scale of the outlet ring of Fig. 1; Fig. 3 is a plan view of a sectionalized form of outlet ring for a nine-cylinder pump made up of two plates with matching depressions in their contacting surfaces; and Fig. 4 is a section on line 4—4 of Fig. 3.

Referring to Figs. 1 and 2, the gasoline injection pump 1, driven by an associated engine through shaft 2 and swash plate S in timed relation at proper speed, has for each pump cylinder C, a piston P and a discharge tube 3 sealed in a duct in the circular wall 4 of the pump and having its end sealed by a plug 5. This tube extends from a delivery valve or port (not shown) to a hole 6 drilled in the integral flange 7 of the pump housing and forming a discharge outlet of the pump. The pump may be generally like that shown in Patent No. 2,286,301.

The pump housing is detachably fastened to the engine frame 8, with the outlet ring 9 of nickel steel therebetween, by means of bolts 10 extending through holes 11 located in the flange 7 radially of the respective pump cylinders, and through holes 12 in the outlet ring, into the engaging threads in drilled holes of the engine frame. It will be observed that the discharge outlets as 6 are arranged circularly around the shaft 2 which projects from the bottom of the pump through the central opening of the outlet ring 9. The hard fibre gasket rings 13, 14 perforated for the bolts 10, are used on the top and bottom of the outlet ring to seal the ring in liquid tight manner between the pump flange and engine frame. Each bolt 10 has a shank 15 with a reduced section to form an annular channel 16 which, in any position to which the bolt may be screwed into the engine frame, registers with its hole 6 and with its transverse channel 17 in the outlet ring.

The transverse channels 17 are drilled interiorly of the outlet ring at various angles from two opposite places along the outer peripheral edge of the ring. Into these channels are inserted respective ones of the engine supply pipes 18 of nickel steel which are then silver-soldered in place in the ring in a fluid-tight manner and bent to lie in two diametrically opposite groups 19 and 20 of contiguous pipes. The pipes extend to the respective places of injection into the engine, as into connection with nozzles N in respective cylinders of the engine or the intake manifold of the engine. Suitable forms of such nozzles are shown in my copending application, Serial No. 432,449, filed February 26, 1942.

In the embodiment of Figs. 3 and 4, the outlet ring, generally indicated as 22, is composed of two ring sections 23 and 24 of nickel steel, each having matching bolt holes 25 which are drilled therethrough, and also having matching channels 26 semi-circular in cross section which are cast, milled or otherwise machined in the contacting surfaces. These contacting surfaces are finished before assembly so as to form liquid-tight circular channels 27, and the joints along the inner and outer peripheries of the ring are then silver-soldered to maintain the matching sections and the matching channels in liquid-tight contact. The nipples 28 of the engine supply pipes are then silver-soldered in the outer ends of the channels, and the pipes 29 are silver-soldered in the outer ends of the nipples. This outlet ring may be fastened to the pump and the engine cylinders in any suitable way, as for instance as described in connection with Figs. 1 and 2.

In connection with both embodiments of outlet rings described herein, whenever it is desired with the engine at rest to remove the pump for inspection, adjustment, repair or replacement of the internal parts, the bolts as 10 of Fig. 1 are first removed, whereupon the pump at 1 may then be lifted off without disturbing the position of the outlet ring on the engine or disconnecting any of the pipes from the outlet ring or the engine. The pump may then be reassembled to the engine by placing it in proper position on the outlet plate and then screwing the fastening bolts in place as shown in Fig. 1. Of course, suitable means are provided for properly recoupling the engine and pump shafts, and for retiming the pump to the engine.

It is obvious from the above description that either embodiment of outlet ring may be constructed in quantity at low cost. Such outlet rings are either solid or of simple sections, and the bolt holes and the transverse channels therein are readily formed or machined. Also the means for fastening the outlet ring in place accurately is both simple and rapid, and the pipes to the engine are likewise simply and inexpensively installed and connected. Furthermore, the method herein disclosed for substantially eliminating leakage of fuel between the transverse channels and at the inner and outer peripheries of the sectionalized outlet rings is simple, inexpensive and effective for the purpose.

Although but two embodiments of the outlet rings for multicylinder liquid pump assemblies are disclosed, many other embodiments and various modifications thereof within the invention will be obvious. For instance, the outlet rings may have any suitable number of bolt holes and transverse channels for any number of pump cylinders, and the pump may be of any suitable construction for pumping liquid at the pressures ordinarily used in connection with translating device associated therewith. Also the outlet ring may be fastened in any other suitable way between the pump and translating device, so long as the pump may be removed without disturbing the position of the ring and if desired without breaking the connection of the pipes to the outlet ring or to the translating device. Also, the connections between the discharge outlets of the pump and the transverse channels of the outlet ring may be effected in any suitable way so long as the fastening means are detachable to permit the removal of the pump. Also, the pipes may be permanently fastened in the outer ends of the transverse channels of the outlet ring in any suitable way, the pipes may be arranged in any kind of groups as desired as for instance the pipes and their connections to the outlet ring may be interchanged in Figs. 2 and 3 or arranged in one or more groups of contiguous pipes, the outlet ring may have any suitable contour at its inner or outer peripheries, and the sections of the sectionalized rings may be made and sealed in a fluid-tight manner, both at the transverse channels and at the peripheries, in any suitable way so long as the leakage between channels and/or at the inner or outer peripheries of the outlet ring is not excessive at the injection pressure used. Furthermore the supply pipes may have liquid-tight joint fittings at the outlet ring or at the translating device or therebetween, whereby if desired these pipes may be broken before or after the pump is removed from the outlet ring. These and other modifications are intended to be covered within the broad interpretation of the appended claims. It will be understood that in the embodiments specifically described, and also in any of the modifications thereof, the outlet ring with or without the entire length of engine supply pipes fastened thereto may be moved from its position on the translating device whenever the pump is first removed.

Having thus described my invention, what I claim is:

1. In a multicylinder liquid pump assembly, a housing, a plurality of separate cylinders in the housing, pistons in the respective cylinders, a drive shaft extending from one end of the housing for driving the pistons, individual cylinder discharge outlets arranged substantially circularly around the shaft near that end of the housing, an outlet ring having inlets for respective ones of said discharge outlets and also having transverse channels extending interiorly of the ring to pipe outlets at the periphery of the ring, detachable fastening means which fasten the ring to the housing with the shaft projecting through the central opening of the ring and which have passages maintaining the discharge outlets of the housing in communication with respective inlets of the ring, and supply pipes fastened to the respective channels at the outer periphery of the ring.

2. In a multicylinder liquid pump assembly, a housing, a plurality of separate cylinders in the housing, pistons in the respective cylinders, a drive shaft extending from one end of the housing for driving the pistons, individual cylinder discharge outlets arranged substantially circularly around the shaft near that end of the housing, an outlet ring which has inlets for the respective ones of said discharge outlets and transverse channels extending interiorly of the ring to pipe outlets at the periphery of the ring and which also has holes through the ring in communication with the separate inlets thereof, detachable fastening means which pass through said holes respectively and fasten the ring to the housing with the shaft projecting through the central opening of the ring and which has passages maintaining the discharge outlets of the housing in communication with respective inlets of the ring, and supply pipes fastened to respective channels at the outer periphery of the ring.

3. In a multicylinder liquid pump assembly, a housing, a plurality of separate cylinders in the housing, pistons in the respective cylinders, a drive shaft extending from one end of the housing for driving the pistons, individual cylinder discharge outlets arranged substantially circularly around the shaft near that end of the housing, an outlet ring having inlets for respective ones of said discharge outlets and also having transverse channels extending interiorly of the ring to pipe outlets at the periphery of the ring, detachable fastening means which fasten the ring to the housing with the shaft projecting through the central opening of the ring and which has passages maintaining the discharge outlets of the housing in communication with respective inlets of the ring, and supply pipes which are fastened to the outlet ring at the outer periphery thereof in communication with respective ones of said channels and which exteriorly of the ring form at least one group of contiguous pipes.

4. In a multicylinder liquid pump assembly, a housing, a plurality of separate cylinders in the housing, pistons in the respective cylinders, a drive shaft extending from one end of the housing for driving the pistons, individual cylinder discharge outlets arranged substantially circularly around the shaft near that end of the housing, a solid outlet ring which has holes therethrough and transversely drilled channels extending interiorly of the ring from the periphery thereof to respective ones of said holes, detachable fastening means which pass through said holes respectively and fasten the ring to the housing and which maintain said holes in communication with respective ones of said discharge outlets, and supply pipes fastened to the respective channels at the outer periphery of the ring.

5. In a multicylinder liquid pump assembly, a housing, a plurality of separate cylinders in the housing, pistons in the respective cylinders, a drive shaft extending from one end of the housing for driving the pistons, individual cylinder discharge outlets arranged substantially circularly around the shaft near that end of the housing, a sectionalized outlet ring which has matching holes therethrough and matching transverse channels formed in the abutting faces of the sections and extending interiorly of the ring from the periphery thereof to respective ones of said holes, detachable fastening means which pass through said holes respectively and fasten the ring to the housing and which maintain said holes in communication with respective ones of said discharge outlets, and supply pipes fastened to the respective channels at the outer periphery of the ring.

BEN G. PARSONS.